United States Patent
Morris et al.

(10) Patent No.: US 11,004,442 B2
(45) Date of Patent: May 11, 2021

(54) PLAYBACK SPEED ANALYSIS FOR AUDIO DATA

(71) Applicant: International Business Machines Corporation, Armonk, NY (US)

(72) Inventors: Francesca Morris, Purley (GB); Giacomo G. Chiarella, Eastleigh (GB); Luke R. Viner, Bristol (GB); Nicholas J. Daffern, Truro (GB); Aiziel Nazario, Douglas (GB)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 16/258,846

(22) Filed: Jan. 28, 2019

(65) Prior Publication Data

US 2020/0243068 A1    Jul. 30, 2020

(51) Int. Cl.
*G10L 15/06*     (2013.01)
*G10L 15/26*     (2006.01)
*G06F 40/279*    (2020.01)

(52) U.S. Cl.
CPC ............ *G10L 15/06* (2013.01); *G06F 40/279* (2020.01); *G10L 15/26* (2013.01)

(58) Field of Classification Search
CPC ...................................................... G10L 15/26
See application file for complete search history.

(56) References Cited

U.S. PATENT DOCUMENTS

| 3,953,680 | A | * | 4/1976 | Zimmermann | ...... | G11B 15/023 |
| | | | | | | 379/77 |
| 6,865,258 | B1 | | 3/2005 | Polcyn | | |
| 7,274,775 | B1 | * | 9/2007 | Zavaliagkos | ......... | H04M 3/533 |
| | | | | | | 369/25.01 |
| 9,245,522 | B2 | | 1/2016 | Hager | | |
| 9,456,170 | B1 | * | 9/2016 | Miller | ...................... | G06K 9/72 |

(Continued)

FOREIGN PATENT DOCUMENTS

EP     3244408 A1     11/2017

OTHER PUBLICATIONS

Inouye, "Can We Speed-Listen and Still Understand?" Medium, Jun. 2, 2016, 4 pages. <https://medium.com/@minouye/can-we-speed-listen-and-still-understand-d8d7f1b554a1>.

(Continued)

*Primary Examiner* — Matthew H Baker
(74) *Attorney, Agent, or Firm* — Brian D. Welle (57) ABSTRACT

A system and method related to creating a reference transcript for a portion of audio data that includes natural language using a speech-to-text recognition process executed at a reference speed. A threshold deviation may be identified from the reference transcript. A plurality of generated transcripts may be generated for the portion of audio data using the speech-to-text recognition process executed at a plurality of increased speeds that each exceed the reference speed. A generated transcript of the plurality of generated transcripts that is the closest to the threshold deviation without exceeding the threshold deviation may be identified. The generated transcript may be generated at a respective increased speed of the plurality of increased speeds. An increased playback speed may be determined for the portion of the audio data based on the respective increased speed of the generated transcript.

20 Claims, 6 Drawing Sheets

(56) References Cited

U.S. PATENT DOCUMENTS

| | | | |
|---|---|---|---|
| 9,685,154 B2* | 6/2017 | Corfield | G10L 15/26 |
| 9,786,283 B2 | 10/2017 | Baker | |
| 2005/0207733 A1 | 9/2005 | Gargi | |
| 2009/0319265 A1* | 12/2009 | Wittenstein | G10L 21/04 |
| | | | 704/234 |
| 2012/0016671 A1* | 1/2012 | Jaggi | G10L 15/22 |
| | | | 704/235 |
| 2013/0031266 A1 | 1/2013 | Gilson | |
| 2017/0064244 A1 | 3/2017 | Abou Mahmoud | |
| 2018/0061453 A1 | 3/2018 | Srinivasan | |
| 2018/0218748 A1 | 8/2018 | Watts | |
| 2019/0311331 A1* | 10/2019 | Steinhoff | G10L 15/05 |
| 2019/0370283 A1* | 12/2019 | Church | G06F 16/483 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

Omoigui et al., "Time-Compression: Systems Concerns, Usage, and Benefits," Microsoft Research, MSR-TR-98-63, Nov. 11, 1998, 10 pages. <https://www.microsoft.com/en-us/research/publication/time-compression-systems-concerns-usage-and-benefits/?from=http%3A%2F%2Fresearch.microsoft.com%2Fen-us%2Fum%2Fredmond%2Fgroups%2Fcoet%25>.

\* cited by examiner

PLAYBACK SPEED ANALYSIS FOR AUDIO DATA

BACKGROUND

The present disclosure relates to playback speed analysis for audio data, and more specifically, to playback speed analysis for increased speed of playback whilst maintaining comprehension.

People are busy and often need or otherwise want to watch videos or listen to podcasts and process auditory information as quickly as possible. However, there may be limits to a speed at which a person may listen to speech for it to still be comprehensible. Without some trial and error and subject to video player limitations, it is difficult to know how fast a user may listen to audio speech and still fully comprehend what is being said.

This is a problem on platforms such as video and audio applications where a user may increase the speed of audio to up to two times the original speed, but selecting that option often results in incomprehensible chatter.

SUMMARY

According to embodiments of the present disclosure, there is provided a computer-implemented method and system and computer readable medium for playback speed analysis for audio data. For example, a reference transcript may be created for a portion of audio data that includes natural language using a speech-to-text recognition process executed at a reference speed. A threshold deviation may be identified from the reference transcript. A plurality of generated transcripts may be generated for the portion of audio data using the speech-to-text recognition process executed at a plurality of increased speeds that each exceed the reference speed. A generated transcript of the plurality of generated transcripts that is the closest to the threshold deviation without exceeding the threshold deviation may be identified. The generated transcript may be generated at a respective increased speed of the plurality of increased speeds. An increased playback speed may be determined for the portion of the audio data based on the respective increased speed of the generated transcript.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to analyzing audio data, more particular aspects relate to identifying an increased speed for playback data. A method and system are provided for determining an increased speed for comprehensible playback of audio data by analyzing transcripts of content at different playback speeds. The audio data may include natural language. For example, the audio data may include a conversation between multiple people, or a lecture or oral dissertation by one person, or a song, or poetry, or the like. The audio data may include a video file including associated audio content such as speech by one or more voices that may include electronically generated voices. While the present disclosure is not necessarily limited to such applications, various aspects of the disclosure may be appreciated through a discussion of various examples using this context.

The method and system compare a text transcript of a portion of the audio data at a reference speed with text transcripts at increased speeds to find an increased speed at which the text transcript is comprehensible (e.g., understandable to most or all or a threshold percentage of listeners). In some examples, the increased speed may approximate or be the maximum speed at which the text transcript is comprehensible. A correlation is drawn between the increased speed at which the text transcript remains comprehensible and an increased speed at which another audio file of a user is comprehensible.

Figure 1:
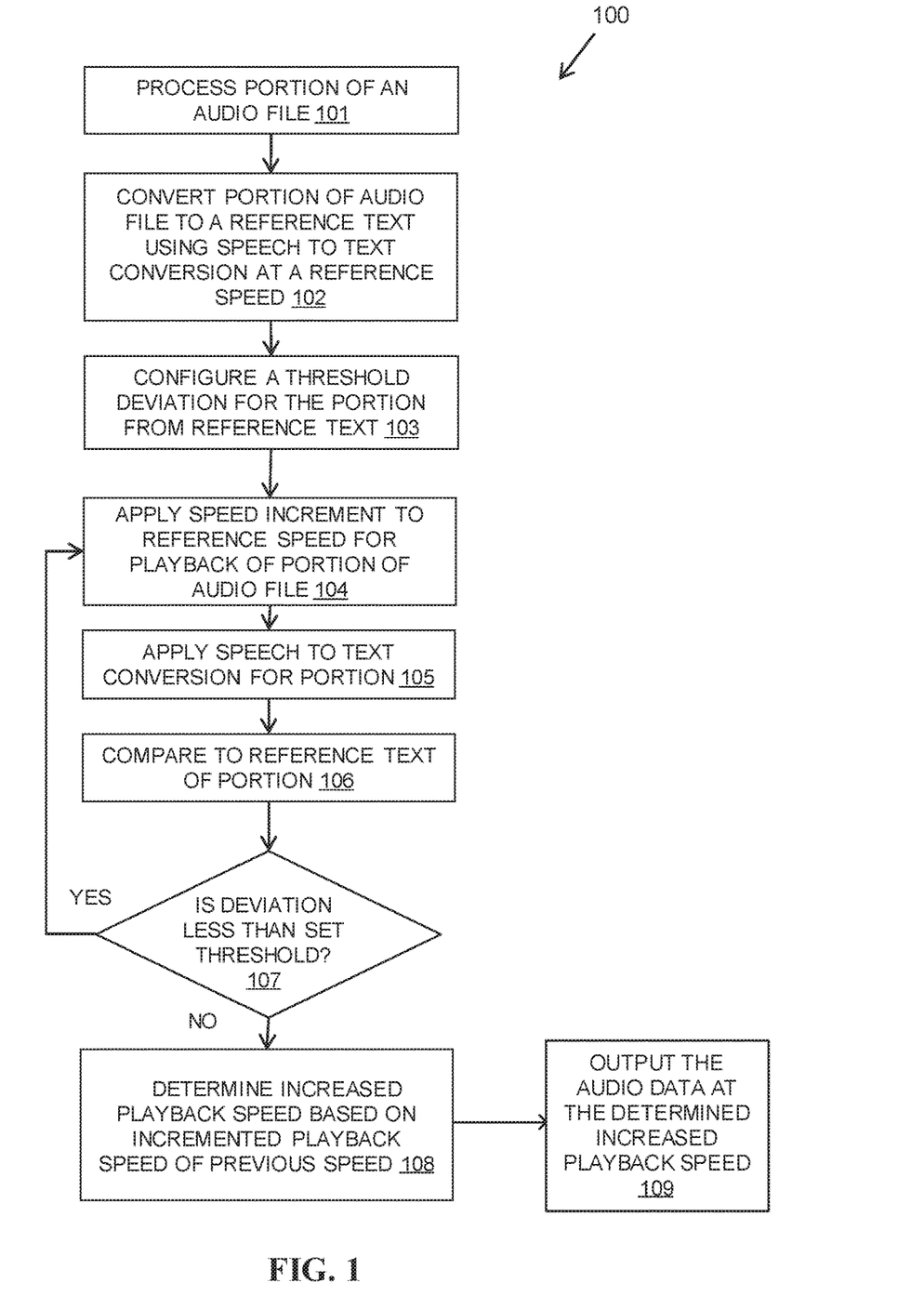
FIG. 1 depicts a flow diagram of a first example embodiment of a method of identifying playback speeds.

Referring to FIG. 1, a flow diagram 100 shows a first example embodiment of the described method of playback speed analysis of audio data to determine a maximum recommended playback speed for the audio data. The method may process at least a portion of the audio data (101). In one embodiment, a portion of the audio data is analyzed as a sample and the result applied to an entire audio file. In another embodiment, multiple portions of the audio data may be analyzed with individual results applied to each portion. In further embodiments, the audio data may be divided into similar content portions to which a common result may be applied.

The portion of the audio data is converted using a speech-to-text conversion at a reference speed to obtain a reference transcript (102). The reference speed may be a speed at which the speech-to-text conversion is substantially accurate. As used herein, a speech-to-text conversion may be accurate when the reference transcript as generated is a substantially 100% correct textual representation of what was spoken in the audio data. In some examples, the reference speed of a comprehensible speech-to-text transcript may be at or close to a speed at which most humans listen to audio data with a substantially 100% comprehension rate (e.g., where each part of the audio data is correctly identified). Very complex language or a strongly accented voice audio may require a slower reference speed to accurately convert the audio data into a reference transcript.

A threshold deviation (e.g., an allowable deviation between the actual word and the converted word) is identified for the portion of the audio data (103). In some examples a user may identify the threshold deviation, or a system may identify a predetermined threshold deviation as stored at a location. As such, the threshold deviation may reflect a "maximum" allowed deviation for a generated transcript that is acceptable considering the increased speed at which the reference transcript is converted relative to the reference speed. Put differently, the threshold deviation may reflect a maximum amount of loss of accuracy and/or fidelity that is acceptable considering the time savings that is gained (e.g., as the audio data may be heard and/or analyzed in less total time).

The threshold deviation may be based on various factors. A threshold deviation may be based on a level of complexity of the portion of the audio data or the entire set of audio data. A complexity of the audio data may be identified by analyzing the complexity of the reference transcript. A complexity of the transcript may be identified by the language used in the transcript, the content of the audio file, a grammatical analysis of the transcript, or the like. For example, a complexity analysis of the text may include identifying a frequency of words (e.g., whether identical or similar or related words are used repeatedly within the audio data or whether the words and therein the topic tend to meander), sentence length (e.g., where a longer sentence indicates a relatively more complex sentence), how rare the utilized words are as compared to other audio files listed to (e.g., "homeostasis" might only be utilized once every 100 podcasts, therefore it is infrequent and would increase the level of complexity, whereas conversely "car" might be a very common word in the podcasts the user hears), or the like. A threshold deviation may additionally, or alternatively, be based on user preferences whereby the threshold may be manually set or may be configured to be based on types of audio file listened to by the user. For example, a user may set a "leisure" podcast related to sports or trivia or the like to have a higher threshold deviation (such that there is more deviation but potentially also a faster possible speed) than a "professional" podcast related to a career of the user.

In some examples, a system may generate numerous portions of the audio data to identify an increased playback speed. For example, a system may generate a portion of the audio data at a plurality of different increased speeds, each of which is faster than the reference speed (e.g., an incrementally faster speed) compared to the reference speed. Identifying an increased playback speed may include a loop of the following steps of the method (steps 104-107) to identify an increased speed at which a generated transcript approaches but does not exceed the threshold deviation.

In some examples, a system may create entirely new audio data by speeding up the portion of the audio data according to the speed increments (e.g., to one of the plurality of increased speeds) (104). The system may generate a generated transcript using speech-to-text conversion using the new audio data from each speed of the plurality of increased speeds (105). The generated transcripts may be compared to the reference transcript of the portion to determine a deviation (106). The system may use natural language processing (NLP) techniques to identify words and syntax and the like between the generated transcripts and the reference transcript. The system may then determine whether any of the generated transcripts defined deviations that were within the threshold deviation (107). In some examples, if the deviation of each of the generated transcripts is less than the threshold deviation, the system may repeat steps 104-106 to attempt to identify a speed at which the threshold deviation is surpassed. If the system identifies a generated transcript that exceeds the threshold deviation, the system may identify the generated transcript that was generated with the fastest increased speed that was within (e.g., was determined to be below) the threshold deviation.

In some examples, if it is determined that the deviation is below the threshold deviation (107), the system may identify an increased playback speed based on the incremented playback speed of a selected version with a deviation closest to and not exceeding the threshold (108). This may be the previous incremented speed, or the method may loop with a more finely tuned incremented speed. For examples, the system may generate new generated transcripts that are generated at a speed slower than the speed at which the "failing" generated transcript (e.g., the transcript that exceeded the threshold deviation) was generated but exceeded the speed at which the next fastest "passing" generated transcript (e.g., a transcript that satisfied or was below the threshold deviation) was generated. The reference speed may be chosen to be substantially similar to the speed of normal human speech, and therefore the incremented speed of the selected version may be used as the incremented playback speed whilst maintaining human understanding.

The audio data at the increased playback speed may be output for a user (109). For example, the increased playback speed may be suggested to a user before playback of the audio data or it may be automatically applied to the audio data that is played for the user. In some examples, the increased playback speed is automatically applied before the audio data is played if this function (automatically playing at the increased playback speed) is preselected by the user.

Figure 2:
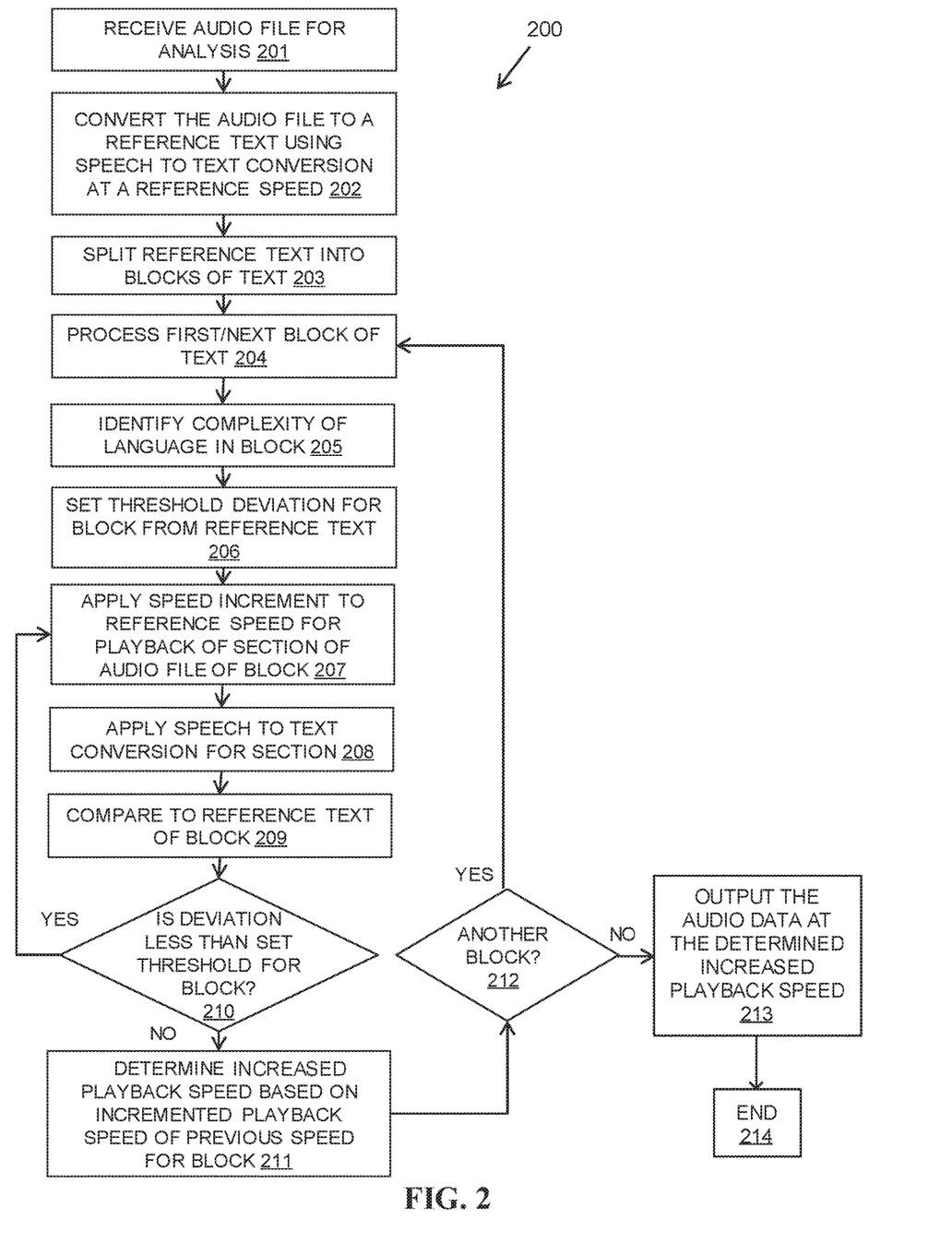
FIG. 2 is a flow diagram of a second example embodiment of a method of identifying playback speeds.

Referring to FIG. 2, a flow diagram 200 depicts a second example embodiment of the described method in which audio data is divided into multiple sections for which differing increased playback speeds are identified. Audio data may be received for analysis (201). For example, the audio data may be uploaded or transmitted from a source or the like. The audio data may be converted to a reference transcript using speech-to-text conversion at a reference speed (202). The reference speed may be, for example, at 1× the playback speed of the audio data. Alternatively, the reference speed may be a slower speed of ½× the playback speed. The reference speed may approximate a speed at which a human may understand (e.g., correctly identify the words) of substantially all of the audio data.

The reference transcript may be split into blocks of text (203). For example, the reference transcript may be split into several blocks of 100-200 words. By splitting the reference transcript into several blocks, the system may separate parts of the audio data into chunks that may be played back at different speeds. This may be adjusted depending on user and/or design preferences. The system may process a first or next block of text (204). For each block, the system may identify a complexity of the language in the block (205). The system may then set a threshold deviation for the block from the reference text (206). The system may set a plurality of threshold deviations using the reference transcript such that a playback may have an increased chance of being comprehensible to a user. For example, for portions of an audio data that are introductory or leisure based, the system may identify a threshold deviation of than 30%. In some examples, a threshold deviation of 30% may be "satisfied" when less than 30% of words or noises or phrases are incorrectly identified and comprehended by a respective user when the user listens to the audio data (e.g., such that the understanding of these words or noises or phrases deviates from their actual meaning). Further, for portions of audio data that are relatively more technical or complex or the like, the system may identify a threshold deviation of around 10% (e.g., where 10% of words or noises or phrases are incorrectly identified and comprehended by a respective user), such that a user needs to understand 90% of the audio data for the threshold deviation to be satisfied. In some examples, a system may compare the contents to the audio data to audio file types that the user usually listens to (e.g., such that the system may identify a relatively lower threshold deviation for audio data that is relatively similar to audio data that a user typically listens to).

The system may identify increase speeds for the section of the audio data of the block by, for example, identifying increments of 0.1× (207). In some examples, the increments may be smaller. The system may apply a speech-to-text conversion for the section of the audio data to produce a second transcript of this faster file (208). The system may then compare this to the reference transcript at 1× speed (209).

The system may determine if the deviation is less than the threshold deviation for the block (210). Where the system determines that the deviation is less than (e.g., does not exceed) the threshold deviation, the method may "loop" to increase the speed again (e.g., by 0.1×) and repeats until the output reaches or exceeds the threshold deviation. When system identifies a generated transcript that approximates but does not exceed the threshold deviation, the system may identify the speed at which this respective generated transcript was generated as the increased playback speed for the block (211). This may be the previous speed tested which was still below the threshold deviation. This may be converted to the maximum speed for the section of the audio data according to a correlation with the reference speed.

A system may determine that there is another block of text (212). If so, the system may loop to process a next block of text (204). For this new block, the system may determine an increased playback speed as discussed herein. The system may continue this until an increased playback speed is determined for all blocks, at which point the system may output each block of the audio data at the respective increased playback speed (213) as described above, after which the method may conclude (214).

In some examples a system may apply user weightings for some users to set threshold deviations. For example, a system may apply a user weighting based on types of audio data that a user typically listens to as these may be comprehensible at a higher speed, or based on a user's own recognized ability to comprehend audio at a faster or slower rate. The weighting may be applied by adjusting the threshold deviation by a weighted amount or by multiplying the final increased playback speed by a weighted amount.

Thus, the system may determine the increased speed for comprehensible playback of audio data by feeding the content into speech-to-text verbal recognition software at different speed intervals (e.g., ×1, ×1.5 and ×2). As the speed of playback increases, it will become less recognizable to the software. At a certain point, the textual output of the software will be critically different from the output from the original speech-to-text analysis at the original speed. This is the point where the software may no longer comprehend the content. The system may then scale this back to get just below the comprehensible level in order to identify the increased speed for comprehension.

In some examples, an increased speed may be affected by the speed of speech in the original file and may need adjusting for the content of the file. For example, if the audio data includes a speaker who naturally speaks faster the increased speed may be relatively slower, and if the audio data includes a speaker who naturally speakers slower the increased speed may be relatively faster. Furthermore, this could also be applied to different sections of the file to speed up slower sections and play the faster sections at a slower speed so that all of the audio data is equally comprehensible.

Conventionally, finding the maximum speed of playback for a particular audio file depends on trial-and-error by the user. This method eliminates that trial-and-error and immediately allows the user to choose the "maximum" increased speed based on the content of the file which has already been analyzed. In this way, aspects of the disclosure may reduce or eliminate the need for a user to waste time by analyzing how well the audio data may be understood at different speeds.

In some examples, even if a user has a typical "maximum playback speed" for their preference (e.g., from watching videos and listening to audio files previously), such a static playback speed may be ineffective or otherwise change depending on the different underlying audio data. For example, an audio file may be tested at ×1, ×1.5, ×2, where at a playback speed of ×2 comprehension is lost. This may coincide with when three volunteers lost comprehension of the speech as well, even as a fourth volunteer, who had experience listening to the podcast, could understand it. As such, by enabling a system to account for a user weighting factor, the system may have an improved ability to determine an increased playback speed at which respective users may listen to the audio data while maintaining a threshold level of comprehension.

For example, the system may receive audio data. The audio data may include natural language of: "Today we are going to talk about the racoons in Canada and how, despite the best efforts of the authorities, they continue to get inside waste bins and steal compost rubbish. This has caused hundreds of residents to complain to the local mayor. Even more people wake up to the sight of all their rubbish spread in their front porch. Some residents have decided to tie their bins to walls, while others are requesting custom made "racoon proof green lids" be installed on their bins. One thing is clear, the citizens are impressed by the ability and ingenuity of racoons when they live in cities. They greatly outsmart their rural counterparts."

At a playback speed of ×1 of the original audio file, the system may utilize speech-to-text processes to convert the audio data to a reference text as: "Today we are going to talk about the records in Canada and how despite the best efforts of the thirties they continue to get inside waistband and still compost rubbish. Hundreds of residents to complain to the local man. More people wake up to the sight of all that rubbish spread in the front porch some residents have decided to tie that binds to the rules while others are requesting custom made or cream proof green leads to be installed on the. One thing is clear the citizens are impressed by the ability and engineer T. over concerns when they live in the cities. A greatly out smart to that rule counterparts."

At a playback speed of ×1.5 of the original audio file, the system may utilize speech-to-text processes to convert the audio data to a reference text as: "Today we are going to talk about the records in Canada and how despite the best efforts of the thirties to continue to get inside waistband and still. This of course hundreds of residents complained to the local media even more people wake up to the side of all that rubbish threat in the front porch some residents have decided to tie his goals while others are requesting custom made. Be installed on the. One thing is that a citizens are impressed by the ability and ingenuity organs with a live in the city greatly outsmarts the rural counterparts."

Further, at a playback speed of ×2 of the original audio file, the system may utilize speech-to-text processes to convert the audio data to a reference text as: "Because it had a dislike of the thirties. This was under the residents. Right type is the one is armed with a custom made screen it's. 20. Identity and ingenuity organs. Yeah."

The system may compare the original transcript at ×1 to a transcript at ×1.5 and sees how they differ. If the two transcripts differ by more than the threshold deviation, the system may deem the generated transcript incomprehensible. The system may identify that at a playback speed of ×2 there is a high deviation from the reference text, such that the audio data is determined to be incomprehensible at the speed. However, the system may determine that deviations from ×1 to ×1.5 does not exceed the threshold deviation. As such, using methods as described above, a system may determine an increase playback system with a high degree of accuracy as it may account for actual comprehension, as opposed to an inferred knowledge of how many "words per second" users are able to listen to.

In some examples, the system may have a component that performs a comparison of the speech-to-text output. Once compared, the system may identify a threshold of difference above which the audio is deemed incomprehensible. This may provide a meaningful determination of how fast audio files may be played before they lose comprehensibility.

Figure 3:
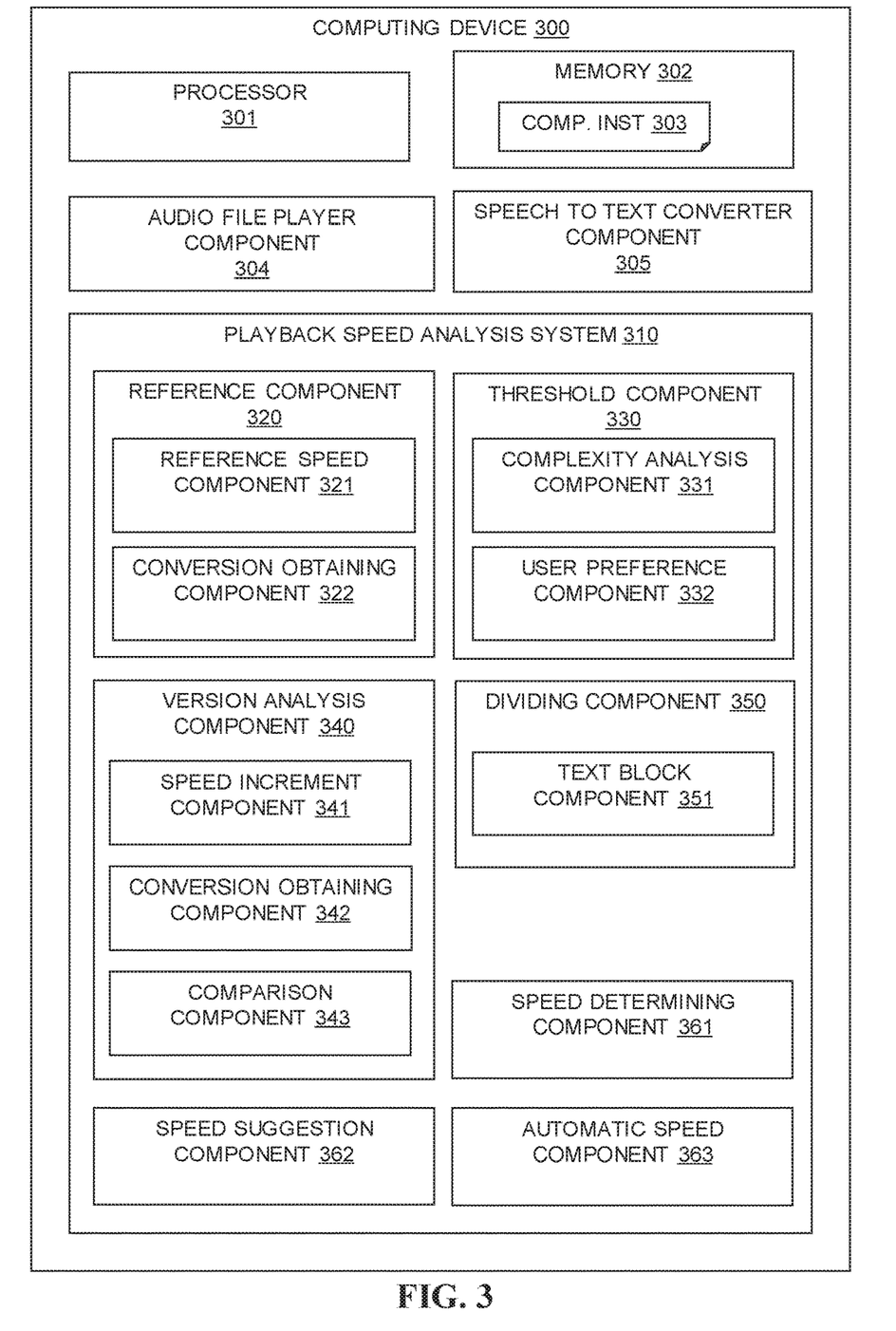
FIG. 3 is block diagram of an example embodiment of a system for identifying playback speeds.

Referring to FIG. 3, a block diagram shows a computing device 300 that is configured to execute the described functionality as a playback speed analysis system 310 for analyzing an input audio file and providing an increased playback speed recommendation.

Computing device 300 includes at least one processor 301. Multiple processors running parallel processing threads may be provided enabling parallel processing of some or all of the functions of the components. Memory 302 may be configured to store computer instructions 303 for the at least one processor 301 to carry out the functionality of the components. For example, memory 302 may store some instructions 303 that correlate to the methods of the flowcharts of FIG. 1 and FIG. 2, such that processor 301 executes these instructions 303 stored on memory 302.

Computing device 300 may have audio data player component 304 for receiving and/or playing media. For example, audio data layer component 304 may be configured to receive or play media in the form of audio files or video files for a user. Computing device 300 may also include or have access to a speech-to-text converter via a speech-to-text converter component 305. For example, a speech-to-text converter may be provided remotely via a network.

Playback speed analysis system 310 may include a reference component 320 for processing at least a portion of audio data to provide a reference transcript. The reference component 320 includes a reference speed component 321 for setting a speed of audio playback for obtaining the reference transcript and a conversion obtaining component 322 for accessing a speech-to-text converter via the speech-to-text converter component 305 to generate the reference transcript.

Playback speed analysis system 310 may include dividing component 350 for dividing audio data into sections for individual processing to obtain maximum playback speed for each section. The dividing component 350 may include a text block component 351 for dividing the audio data based on blocks of text of the reference transcript that may have different maximum playback speed requirements.

Playback speed analysis system 310 may include threshold component 330 for configuring a threshold for deviation of a generated transcript from the reference transcript. Threshold component 330 may include complexity analysis component 331 for analyzing the complexity of the reference transcript of the portion of the audio data and applying a suitable threshold deviation as described herein. Threshold component 330 may also include user preference component 332 for basing the threshold on user preferences including types of audio file the user is accustomed to listening to.

Playback speed analysis system 310 may include version analysis component 340 for analyzing multiple versions of the portion of the audio data with each version having an incremented playback speed compared to the reference speed. Version analysis component 340 may include speed increment component 341 for applying a speed increment to obtain a version of the portion of the audio data. Version analysis component 340 may further include conversion obtaining component 342 for accessing a speech-to-text conversion of the version of the portion of the audio data resulting in a generated transcript. In some examples, version analysis component 340 may include comparison component 343 for comparing the generated transcript to the reference transcript to determine a deviation.

Playback speed analysis system 310 may include speed determining component 361 for determining a maximum playback speed of a portion of the audio data based on the incremented playback speed of a version with a deviation closest to and not exceeding the threshold. In some examples, playback speed analysis system 310 may include speed suggestion component 362 for suggesting the maximum playback speed to a user before playback of the audio data and/or automatic speed component 363 for automatically applying the determined maximum playback speed applied to the audio data.

Figure 4:
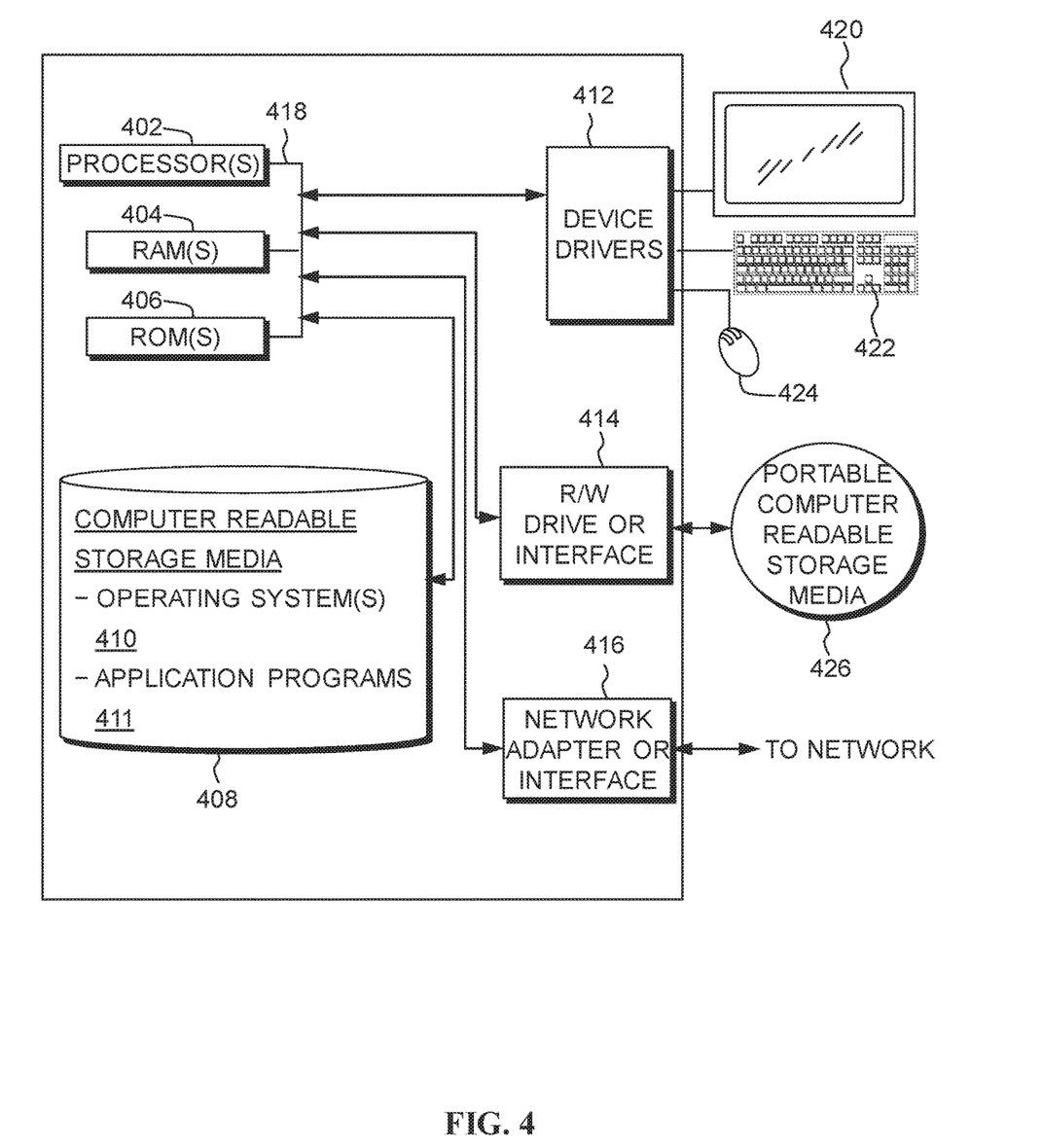
FIG. 4 is a block diagram of an embodiment of a computer system or cloud server in which playback speeds may be identified

FIG. 4 depicts a block diagram of hardware components of computing device 300 of FIG. 3, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 300 may include one or more processors 402, one or more computer-readable RAMs 404, one or more computer-readable ROMs 406, one or more computer readable storage media 408, device drivers 412, read/write drive or interface 414, and network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within the system.

One or more operating systems 410, and application programs 411, such as playback speed analysis system 310, may be stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that may store a computer program and digital information, in accordance with embodiments of the invention.

Computing device 300 may include a R/W drive or interface 414 to read from and write to one or more portable computer readable storage media 426. Application programs 411 on computing device 300 may be stored on one or more of the portable computer readable storage media 426, read via the respective R/W drive or interface 414 and loaded into the respective computer readable storage media 408.

Computing device 300 may also include a network adapter or interface 416, such as a TCP/IP adapter card or wireless communication adapter. Application programs 411 on computing device 300 may be downloaded to the computing device from an external computer or external storage device via a network (for example, the Internet, a local area network or other wide area networks or wireless networks) and network adapter or interface 416. From the network adapter or interface 416, the programs may be loaded into the computer readable storage media 408. The network may comprise copper wires, optical fibers, wireless transmission, routers, firewalls, switches, gateway computers and edge servers.

Computing device 300 may also include a display screen 420, a keyboard or keypad 422, and a computer mouse or touchpad 424. Device drivers 412 may interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414, and network adapter or interface 416 may comprise hardware and software stored in computer readable storage media 408 and/or ROM 406.

Aspects of the present invention may include a system, a method, and/or a computer program product at any possible technical detail level of integration. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Characteristics are as follows:

On-demand self-service: a cloud consumer may unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities may be rapidly and elastically provisioned, in some cases automatically, to quickly scale out and rapidly released to quickly scale in. To the consumer, the capabilities available for provisioning often appear to be unlimited and may be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage may be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
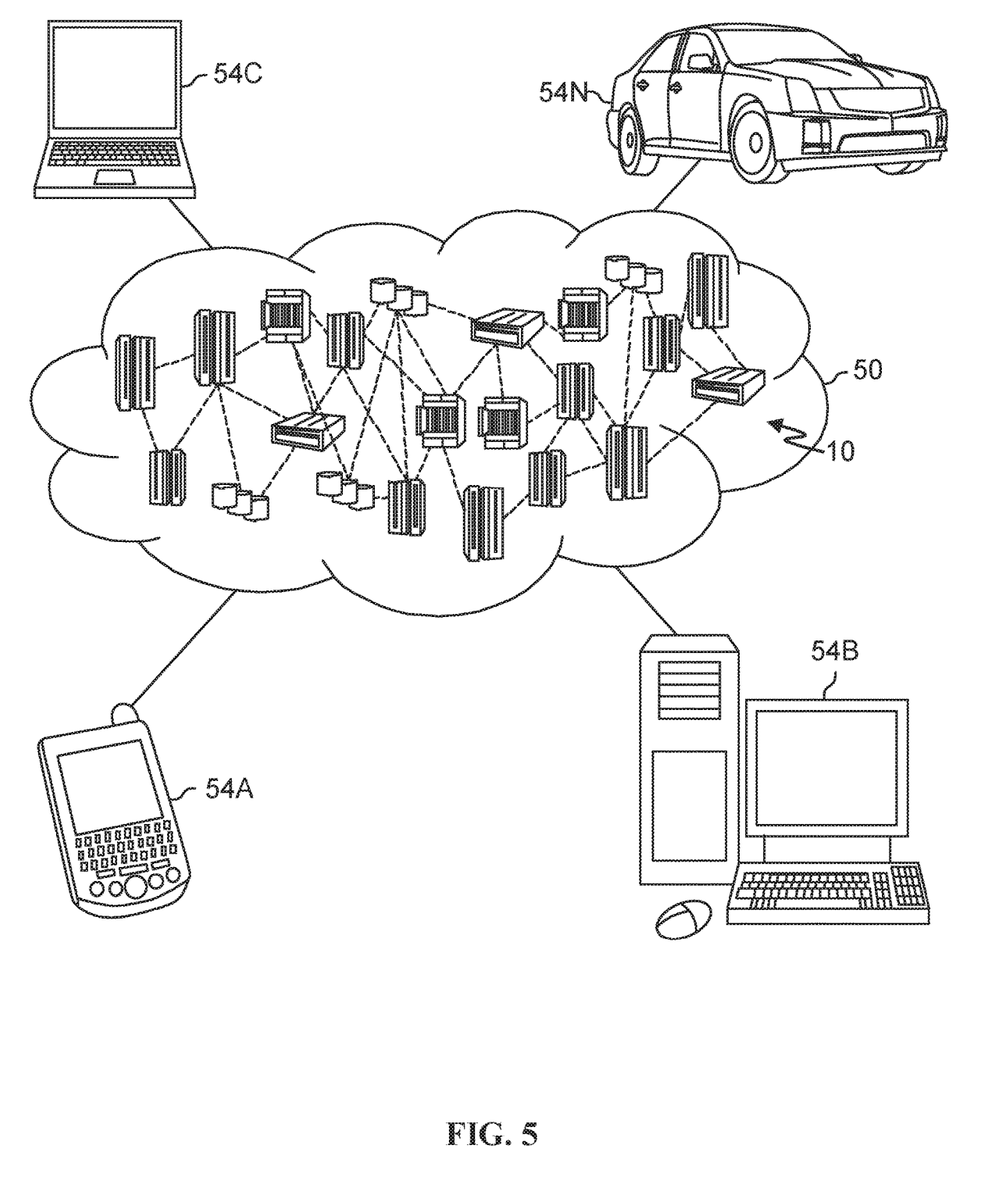
FIG. 5 is a schematic diagram of a cloud computing environment in which playback speeds may be identified.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 may communicate with any type of computerized device over any type of network and/or network addressable connection (e.g., using a web browser).

Figure 6:
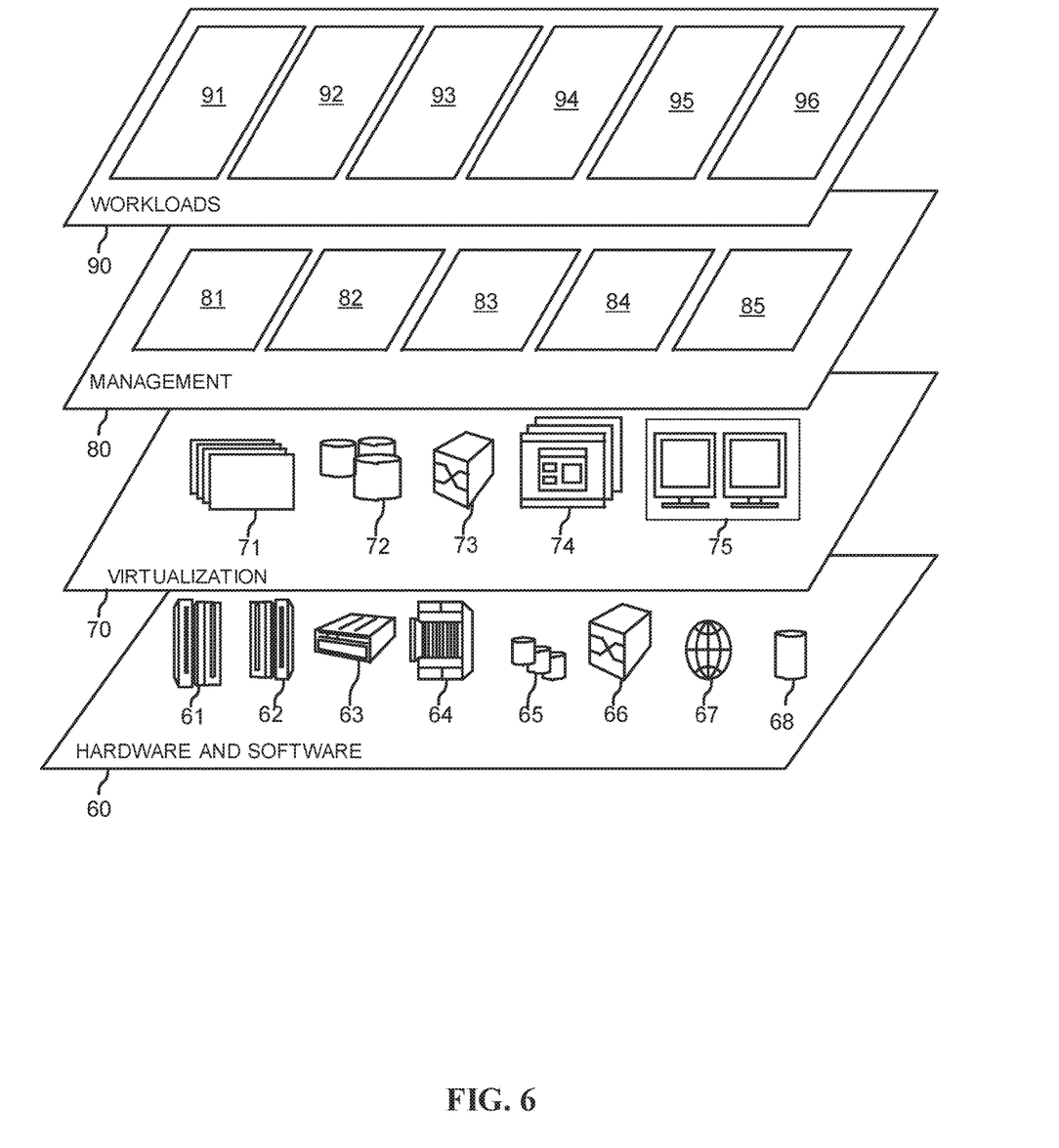
FIG. 6 is a diagram of abstraction model layers of a cloud computing environment in which playback speeds may be identified.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and audio file playback analysis processing 96.

The descriptions of the various embodiments of the present invention have been presented for purposes of illustration, and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications may be made to the foregoing without departing from the scope of the present invention.

What is claimed is:

1. A computer-implemented method for playback speed analysis for audio data, the method comprising:
creating a reference transcript for a portion of audio data that includes natural language using a speech-to-text recognition process executed at a reference speed;
identifying a threshold deviation from the reference transcript;
generating a plurality of generated transcripts for the portion of audio data using the speech-to-text recognition process executed at a plurality of increased speeds that each exceed the reference speed;
identifying a generated transcript of the plurality of generated transcripts that is the closest to the threshold deviation without exceeding the threshold deviation, the generated transcript generated using the speech-to-text recognition process executed at a respective increased speed of the plurality of increased speeds; and
determining an increased playback speed for the portion of the audio data based on the respective increased speed of the generated transcript.

2. The method as claimed in claim 1, wherein the reference speed is substantially similar to a normal rate of human speech.

3. The method as claimed in claim 1, wherein identifying the threshold deviation includes identifying a level of complexity of the audio data.

4. The method as claimed in claim 3, further comprising identifying the level of complexity of the audio data by identifying a complexity of the reference transcript of the portion of the audio data.

5. The method as claimed in claim 1, wherein identifying the threshold deviation includes identifying user preferences.

6. The method as claimed in claim 5, wherein user preferences are based on a comparison of the audio data to types of audio file listened to by a user.

7. The method as claimed in claim 1, wherein the increased playback speed determined for the portion of the audio data is applied to the entire audio file.

8. The method as claimed in claim 1, wherein:
the portion of the audio data is a first portion and the audio data further includes a second portion;
the reference transcript is a first reference transcript;
the threshold deviation is a first threshold deviation;
the plurality of generated transcripts is a first plurality of generated transcripts;
the generated transcript is a first generated transcript;
the respective increased speed is a first respective increased speed;
the increased playback speed is a first playback speed; and the plurality of increased speeds is a first plurality of increase speeds, the method further comprising:
creating a second reference transcript for the second portion of audio data using the speech-to-text recognition process executed at the reference speed;
identifying a second threshold deviation from the second reference transcript;
generating a second plurality of generated transcripts for the second portion of audio data using the speech-to-text recognition process executed at a second plurality of increased speeds that each exceed the reference speed;
identifying a second generated transcript of the second plurality of generated transcripts that is the closest to the second threshold deviation without exceeding the second threshold deviation, the second generated transcript generated using the speech-to-text recognition process executed at a second respective increased speed of the second plurality of increased speeds; and
determining a second increased playback speed for the second portion of the audio data based on the second respective increased speed of the second generated transcript.

9. The method as claimed in claim 8, wherein the first threshold deviation is substantially different than the first threshold deviation.

10. The method as claimed in claim 1, wherein the increased playback speed is suggested to a user before playback of the audio data.

11. The method as claimed in claim 1, wherein the increased playback speed is automatically applied to the audio data.

12. A system for playback speed analysis for audio data, system comprising:
a processor; and
a memory communicatively coupled to the processor, the memory storing instructions that, when executed by the processor, cause the processor to:
create a reference transcript for a portion of audio data that includes natural language using a speech-to-text recognition process executed at a reference speed;
identify a threshold deviation from the reference transcript;
generate a plurality of generated transcripts for the portion of audio data using the speech-to-text recognition process executed at a plurality of increased speeds that each exceed the reference speed;
identify a generated transcript of the plurality of generated transcripts that is the closest to the threshold deviation without exceeding the threshold deviation, the generated transcript generated using the speech-to-text recognition process executed at a respective increased speed of the plurality of increased speeds; and
determine an increased playback speed for the portion of the audio data based on the respective increased speed of the generated transcript.

13. The system as claimed in claim 12, wherein the reference speed is substantially similar to a normal rate of human speech.

14. The system as claimed in claim 12, wherein the memory further includes instructions that, when executed by the processor, cause the processor to identify a complexity of the reference transcript of the portion of the audio data.

15. The system as claimed in claim 12, wherein identifying the threshold deviation includes identifying user preferences.

16. The system as claimed in claim 12, wherein the increased playback speed determined for the portion of the audio data is applied to the entire audio file.

17. The system as claimed in claim 12, wherein:
the portion of the audio data is a first portion and the audio data further includes a second portion;
the reference transcript is a first reference transcript;
the threshold deviation is a first threshold deviation;
the plurality of generated transcripts is a first plurality of generated transcripts;
the generated transcript is a first generated transcript;
the respective increased speed is a first respective increased speed;
the increased playback speed is a first playback speed; and
the plurality of increased speeds is a first plurality of increase speeds, wherein the memory further includes instructions that, when executed by the processor, cause the processor to:
create a second reference transcript for the second portion of audio data using the speech-to-text recognition process executed at the reference speed;
identify a second threshold deviation from the second reference transcript;
generate a second plurality of generated transcripts for the second portion of audio data using the speech-to-text recognition process executed at a second plurality of increased speeds that each exceed the reference speed;
identify a second generated transcript of the second plurality of generated transcripts that is the closest to the second threshold deviation without exceeding the second threshold deviation, the second generated transcript generated using the speech-to-text recognition process executed at a second respective increased speed of the second plurality of increased speeds; and
determine a second increased playback speed for the second portion of the audio data based on the second respective increased speed of the second generated transcript.

18. The system as claimed in claim 12, wherein the memory further includes instructions that, when executed by the processor, cause the processor to suggest the increased playback speed to a user before playback of the audio data.

19. The system as claimed in claim 12, wherein the memory further includes instructions that, when executed by the processor, cause the processor to automatically apply the determined increased playback speed to the audio data.

20. A computer program product for playback speed analysis for audio data, the computer program product comprising a computer readable storage medium having program instructions embodied therewith, the program instructions executable by a processor to cause the processor to:
create a reference transcript for a portion of audio data that includes natural language using a speech-to-text recognition process executed at a reference speed;
identify a threshold deviation from the reference transcript;
generate a plurality of generated transcripts for the portion of audio data using the speech-to-text recognition process executed at a plurality of increased speeds that each exceed the reference speed;

identify a generated transcript of the plurality of generated transcripts that is the closest to the threshold deviation without exceeding the threshold deviation, the generated transcript generated using the speech-to-text recognition process executed at a respective increased speed of the plurality of increased speeds; and determine an increased playback speed for the portion of the audio data based on the respective increased speed of the generated transcript.

\* \* \* \* \*